United States Patent
Aoyama et al.

(10) Patent No.: US 9,190,081 B2
(45) Date of Patent: Nov. 17, 2015

(54) AF-COUPLED DUAL SIDE SHIELD READER WITH AF-COUPLED USL

(71) Applicant: HGST Netherlands B.V., Amsterdam (NL)

(72) Inventors: Jun Aoyama, Kanagawa-Ku (JP); Masato Shiimoto, Odawara (JP); Hiroyuki Katada, Odawara (JP); Kenichi Meguro, Kaiseimachi (JP); Nobuo Yoshida, Hiratsuka (JP)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/194,488

(22) Filed: Feb. 28, 2014

(65) Prior Publication Data

US 2015/0248903 A1 Sep. 3, 2015

(51) Int. Cl.
*G11B 5/39* (2006.01)

(52) U.S. Cl.
CPC .................................. *G11B 5/3912* (2013.01)

(58) Field of Classification Search
CPC ..................... G11B 5/3912; G11B 2005/3996; G11B 5/3932; G11B 5/11; G11B 5/39
USPC ............. 360/324, 324.1, 324.11, 324.12, 319
See application file for complete search history.

(56) References Cited

U.S. PATENT DOCUMENTS

| | | | |
|---|---|---|---|
| 6,927,952 B2 | 8/2005 | Shimizu et al. | |
| 6,980,403 B2 | 12/2005 | Hasegawa | |
| 7,268,985 B2 | 9/2007 | Freitag et al. | |
| 7,312,958 B2 | 12/2007 | Aono | |
| 7,599,151 B2 | 10/2009 | Hatatani et al. | |
| 7,599,154 B2 | 10/2009 | Sbiaa et al. | |
| 7,869,165 B2 | 1/2011 | Miyauchi et al. | |
| 8,331,063 B2 | 12/2012 | Hara et al. | |
| 8,369,048 B2 | 2/2013 | Miyauchi et al. | |
| 8,437,106 B2 * | 5/2013 | Yanagisawa et al. | 360/319 |
| 8,477,461 B2 * | 7/2013 | Chou et al. | 360/319 |
| 8,531,801 B1 * | 9/2013 | Xiao et al. | 360/319 |
| 8,630,069 B1 * | 1/2014 | Okawa et al. | 360/319 |
| 8,749,926 B1 * | 6/2014 | Le et al. | 360/324.12 |
| 8,760,820 B1 * | 6/2014 | McKinlay et al. | 360/319 |
| 8,780,506 B1 * | 7/2014 | Maat et al. | 360/319 |
| 8,879,213 B2 * | 11/2014 | Isowaki et al. | 360/319 |
| 2011/0051291 A1 * | 3/2011 | Miyauchi et al. | 360/245.3 |
| 2011/0279923 A1 * | 11/2011 | Miyauchi et al. | 360/75 |
| 2012/0087045 A1 * | 4/2012 | Yanagisawa et al. | 360/294 |
| 2012/0087046 A1 * | 4/2012 | Yanagisawa et al. | 360/294 |
| 2012/0250189 A1 * | 10/2012 | Degawa et al. | 360/235.4 |

OTHER PUBLICATIONS

Fujitsu Computer Products of America, Inc.; "CPP Read-Head Technology Enables Smaller Form Factor Storage"; www.fcpa.fujitsu.com; 2006; Sunnyvale, CA; 4 pages.

* cited by examiner

*Primary Examiner* — Angel Castro
(74) *Attorney, Agent, or Firm* — Patterson & Sheridan, LLP (57) ABSTRACT

The embodiments disclosed generally relate to a read head sensor in a magnetic recording head. The read head sensor comprises side shields in addition to the upper and lower shields. The upper shield sensor is a multilayer structure with antiferromagnetic coupling. The side shield is a multilayer structure whereby a lower magnetic layer is separated from an upper magnetic layer. The upper magnetic layer is ferromagnetically coupled to a bottom layer of the upper shield. The bias direction of the read head sensor is antiparallel to the bottom layer of the upper shield.

22 Claims, 6 Drawing Sheets

AF-COUPLED DUAL SIDE SHIELD READER WITH AF-COUPLED USL

BACKGROUND OF THE INVENTION

1. Field of the Invention

Embodiments disclosed herein generally relate to a magnetic read head sensor for use in a hard disk drive. The read head sensor is a magnetoresistive effect type. In particular, the embodiments relate to read head sensors utilizing side shields.

2. Description of the Related Art

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider towards the surface of the disk when the disk is not rotating but, when the disk rotates, air is swirled by the rotating disk adjacent a media facing surface (MFS), such as an air bearing surface (ABS), of the slider causing the slider to ride on an air bearing a slight distance from the surface of the rotating disk. When the slider rides on the air bearing, the write and read heads are employed for writing and reading magnetic transitions corresponding to host data. The read and write heads are connected to a signal processing circuitry that operates according to a computer program to implement the writing and reading functions.

The read head of a hard disk drive includes a spin valve element utilizing a magnetoresistive effect. By sensing the relative magnetizations of two ferromagnetic thin films sandwiching an intermediate layer, magnetic information can be read from nanoscale magnets on the disk. Reductions in various dimensions of the sensor element and improvements in the film characteristics have contributed to improvements in recording density, allowing current recording tracks to achieve a width less than approximately 100 nanometers.

However, further improvements in recording density using previously known devices have proven to be difficult. Therefore, there is a need in the art for an improved read head having side shields.

SUMMARY OF THE INVENTION

The embodiments disclosed generally relate to a read head sensor in a magnetic recording head. The read head sensor comprises side shields in addition to the upper and lower shields. The upper shield is a multilayer structure with antiferromagnetic coupling. The side shield is a multilayer structure whereby a lower magnetic layer is separated from an upper magnetic layer. The upper magnetic layer is ferromagnetically coupled to a bottom layer of the upper shield. The bias direction of the read head sensor is antiparallel to the bottom layer of the upper shield.

In one embodiment, a read head sensor comprises a bottom shield and a top shield disposed over the bottom shield. The top shield includes a bottom magnetic layer; a first nonmagnetic layer disposed on the bottom magnetic layer; a top magnetic layer disposed on the first nonmagnetic layer; and an antiferromagnetic layer disposed on the top magnetic layer. The sensor further includes a sensor element disposed between the bottom shield and the top shield; and a side shield disposed adjacent the sensor element, over the bottom shield and below the top shield. The side shield includes a bottom side shield layer disposed over the bottom shield; a second nonmagnetic layer disposed on the bottom side shield layer; and a top side shield layer disposed on the second nonmagnetic layer.

In another embodiment, a read head sensor comprises a bottom shield and a top shield disposed over the bottom shield. The top shield includes: a bottom magnetic layer; a first nonmagnetic layer disposed on the bottom magnetic layer; a top magnetic layer disposed on the first nonmagnetic layer; and an antiferromagnetic layer disposed on the top magnetic layer. The sensor further includes a sensor element disposed between the bottom shield and the top shield; and a side shield disposed adjacent the sensor element, over the bottom shield and below the top shield, wherein the side shield includes multiple magnetic layers.

In another embodiment, a read head sensor comprises a bottom shield and a top shield disposed over the bottom shield. The top shield includes a bottom magnetic layer; a first nonmagnetic layer disposed on the bottom magnetic layer; a top magnetic layer disposed on the first nonmagnetic layer; and an antiferromagnetic layer disposed on the top magnetic layer. The sensor further includes a sensor element disposed between the bottom shield and the top shield, wherein the sensor element comprises a free magnetic layer that is biased antiparallel to the bottom magnetic layer; and a side shield disposed adjacent the sensor element, over the bottom shield and below the top shield, wherein the side shield includes multiple magnetic layers.

In another embodiment, a storage device comprises one or more magnetic disks; a spindle motor coupled to the one or more magnetic disks, wherein the spindle motor is coupled to a chassis; an actuator coupled to the chassis; one or more actuator arms coupled to the actuator and movable from a first position to a second position, wherein the second position is closer to the one or more magnetic disks than the first position; and a read head sensor coupled to each actuator arm. The at least one read head sensor comprises: a bottom shield and a top shield disposed over the bottom shield. The top shield includes: a bottom magnetic layer; a first nonmagnetic layer disposed on the bottom magnetic layer; a top magnetic layer disposed on the first nonmagnetic layer; and an antiferromagnetic layer disposed on the top magnetic layer. The at least one read head sensor also includes a sensor element disposed between the bottom shield and the top shield; and a side shield disposed adjacent the sensor element, wherein the side shield is disposed over the bottom shield and below the top shield, wherein the side shield includes multiple magnetic layers.

BRIEF DESCRIPTION OF THE DRAWINGS

So that the manner in which the above recited features can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. It is to be noted, however, that the appended drawings illustrate only typical embodiments of this invention and are therefore not to be considered limiting of its scope, for the invention may admit to other equally effective embodiments in any field involving magnetic sensors.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The embodiments disclosed generally relate to a read head sensor in a magnetic recording head. The read head sensor comprises side shields in addition to the upper and lower shields. The upper shield is a multilayer structure with antiferromagnetic coupling. The side shield is a multilayer structure whereby a lower magnetic layer is separated from an upper magnetic layer. The upper magnetic layer is ferromagnetically coupled to a bottom layer of the upper shield. The bias direction of the read head sensor is antiparallel to the bottom layer of the upper shield.

Figure 1:
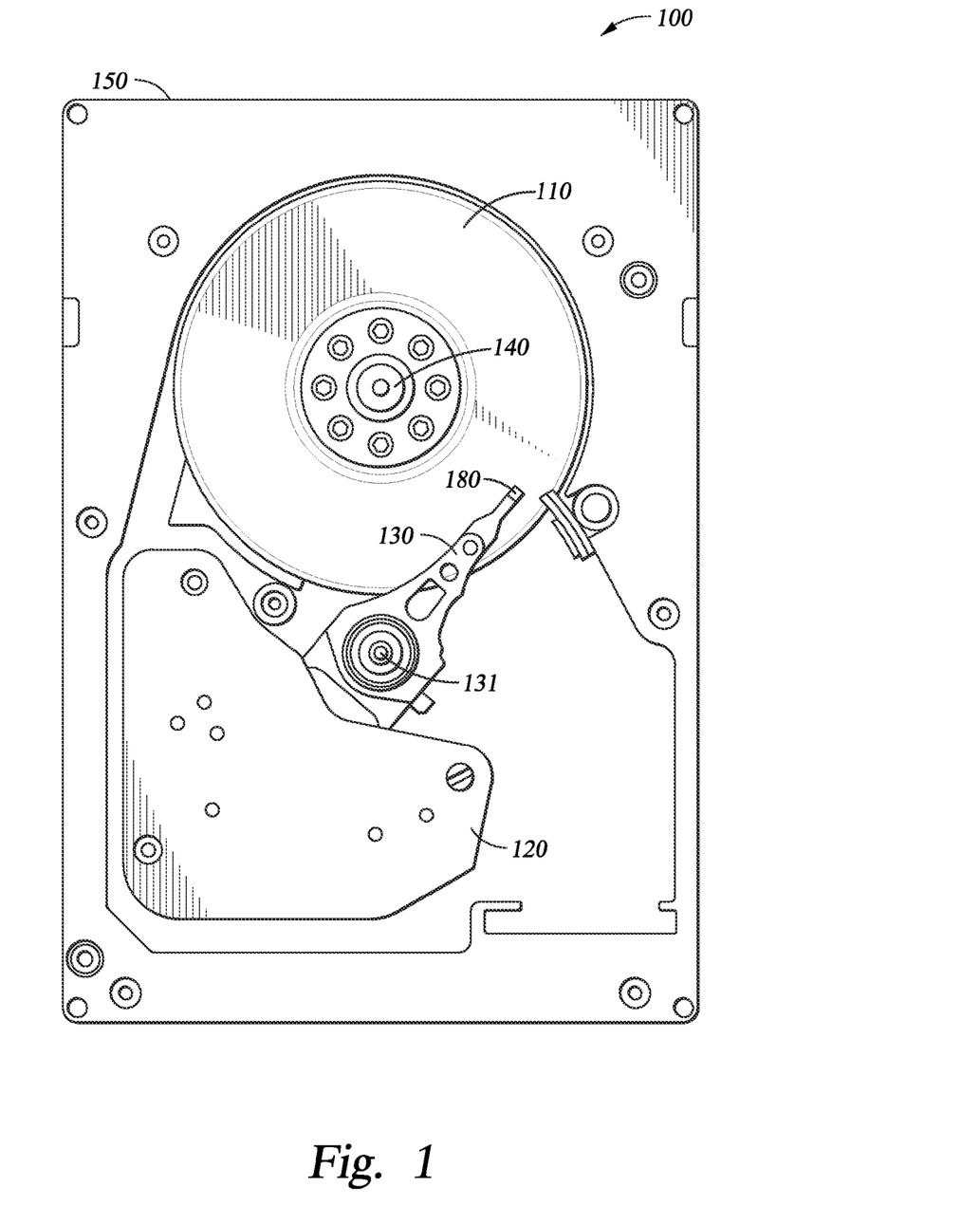
FIG. 1 illustrates an exemplary magnetic disk drive, according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks 110, and spindle motor 140 affixed in a chassis 150. The one or more magnetic disks 110 may be arranged vertically as illustrated in FIG. 1. Moreover, the one or more magnetic disks 110 may be coupled with the spindle motor 140.

Magnetic disks 110 may include circular tracks of data on both the top and bottom surfaces of the disk. A magnetic head 180 mounted on a slider may be positioned on a track. As each disk spins, data may be written on and/or read from the data track. Magnetic head 180 may be coupled to an actuator arm 130 as illustrated in FIG. 1. Actuator arm 130 may be configured to swivel around actuator axis 131 to place magnetic head 180 on a particular data track.

Figure 2:
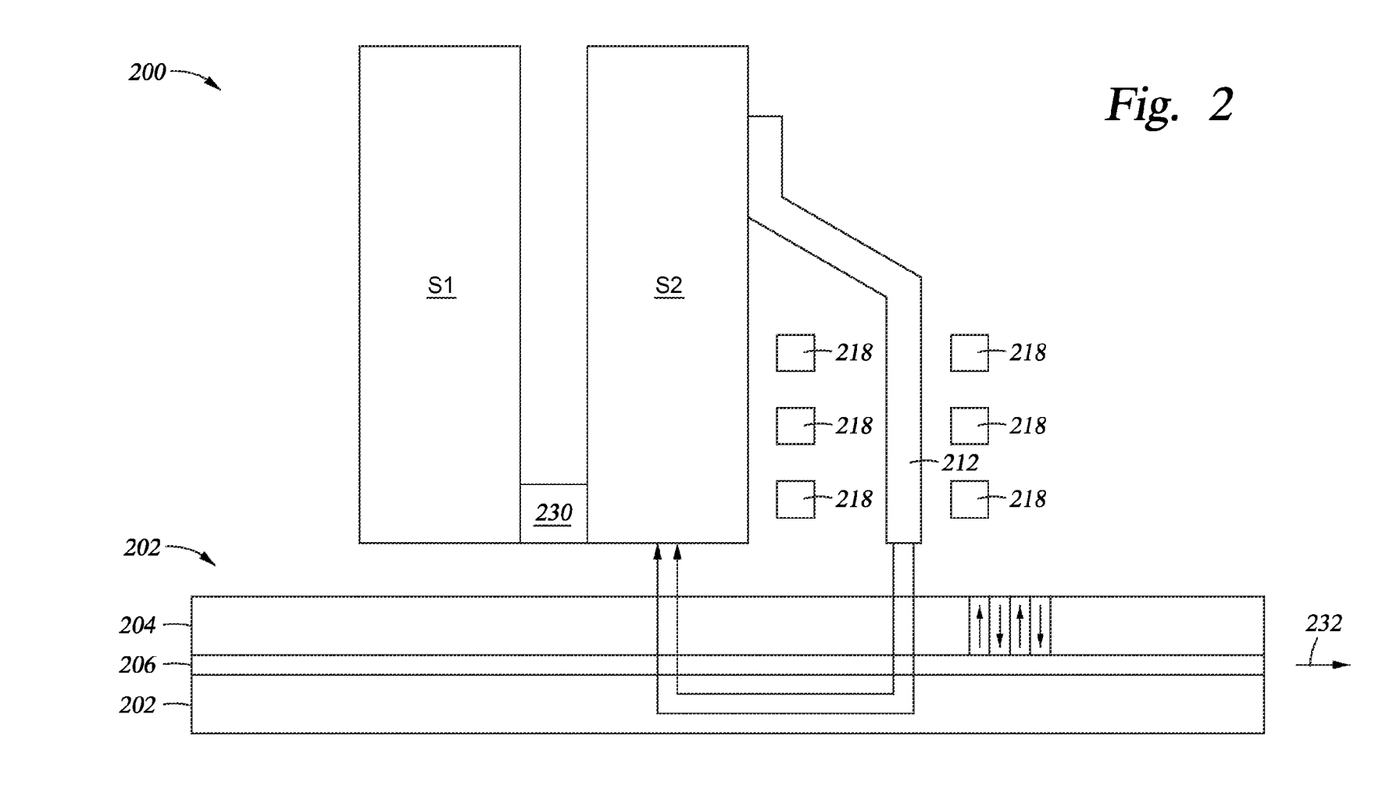
FIG. 2 is a side view of a read/write head and magnetic disk of the disk drive of FIG. 1, according to one embodiment of the invention.

FIG. 2 is a fragmented, cross-sectional side view through the center of a read/write head 200 facing magnetic disk 202. The read/write head 200 and magnetic disk 202 may correspond to the magnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (PL) 206. The read/write head 200 includes a MFS, a magnetic write head and a magnetic read head, and is mounted such that its MFS is facing the magnetic disk 202. In FIG. 2, the disk 202 moves past the head 200 in the direction indicated by the arrow 232. The RL 204 is illustrated with perpendicularly recorded or magnetized regions, with adjacent regions having magnetization directions, as represented by the arrows located in the RL 204. The magnetic fields of the adjacent magnetized regions are detectable by the sensing element 230 as the recorded bits. The write head includes a magnetic circuit made up of a main pole 212 and a thin film coil 218 shown in the section embedded in nonmagnetic material 219.

In the embodiments discussed herein, the read head sensor is a side shield read head sensor. A side shield read head sensor includes a soft magnetic body in the track width direction of the spin valve element, thus leading to sensitivity reduction at the skirt region of the read sensitivity distribution in the track width direction. The skirt reduction of the read sensitivity distribution occurs because the spin valve element captures the magnetic field generated at the center part of the recording track, and the magnetic shield formed by a soft magnetic body absorbs the magnetic field generated by portions of the recording track other than the center part. By reducing the skirt of the sensitivity distribution, the track density can be improved because the reading noise and interference of adjacent tracks can be reduced.

The side shield read sensor, which arranges soft magnetic shield material on both sides of the magnetoresistive element, is effective in realization of high TPI (track per inch). The side shields result in the sensitivity profile of the skirt region in the cross-track direction becomes smaller, and reading-out of track edge noise can be reduced, and as a result, produce higher TPI recording. However, in order to get stable magnetic domain control force, an upper shield becomes magnetically-stable state due to the antiferromagnetically coupling structure. Therefore, there is a problem to which the magnetic permeability of an upper shield decreases and resolution worsens as a result.

To improve resolution, the side shield can comprise a two-layer magnetic structure with antiferromagnetic coupling with an enlarged magnetization of the lower layer of the two layer structure. As a result, the direction of a bias magnetic field becomes the magnetization direction of the lower layer of an upper shield S2, and anti-parallel. Additionally, the magnetic anisotropy of the upper shield bottom can weaken effectually, magnetic permeability increases, and resolution is improved.

Figure 3:
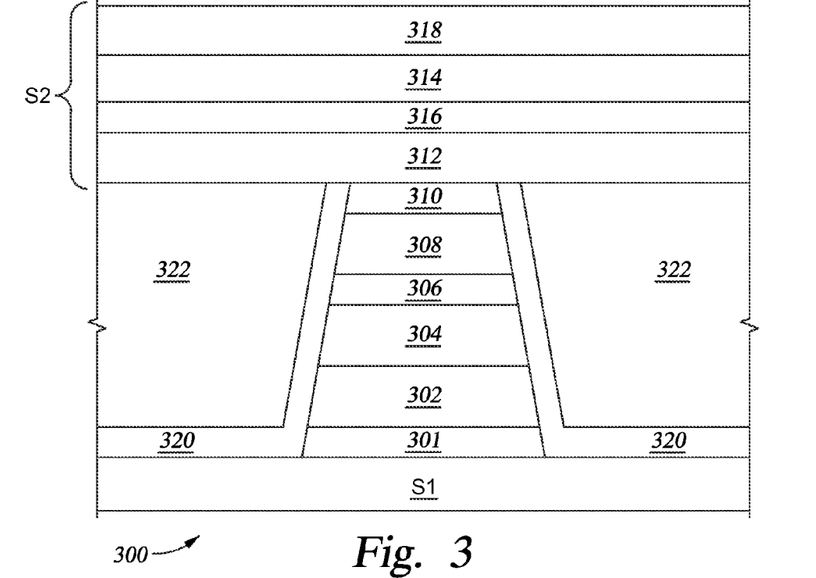
FIG. 3 is a schematic illustration of a read head according to one embodiment.

FIG. 3 is an MFS view of a magnetic read head sensor 300 having a side shield. The read head 300 comprises an underlayer 301 and a first antiferromagnetic layer 302 disposed on the bottom shield S1. The underlayer 301 may comprise a compound of Ta and Ru and have a thickness of about 3 nm. In one embodiment, the first antiferromagnetic layer 302 comprises PtMn, IrMn, PtPdMn, NiMn or combinations thereof and has a thickness of about 60 angstroms. In one embodiment, the antiferromagnetic layer 302 has a thickness of about 4 nm. A pinned magnetic layer 304 is then disposed on the first antiferromagnetic layer 302. The pinned magnetic layer 304 may have a thickness of about 2 nm. The pinned magnetic layer 304 may comprise one of several types of pinned layers, such as a simple pinned, antiparallel pinned, self pinned or antiferromagnetic pinned sensor. The pinned and reference layers can be constructed of several magnetic materials such as, for example NiFe, CoFe, CoFeB, or diluted magnetic alloys.

A layer 306, which may be an oxide barrier layer in the case of a TMR sensor or a conductive layer in the case of a GMR sensor, is disposed on the pinned magnetic layer 304. If the read head 300 is a TMR sensor, then layer may comprise $MgO$, $HfO_2$, $TiO_2$ or $Al_2O_3$. If layer the read head 300 is a GMR sensor, layer 306 may comprise copper. The layer 306 may have a thickness of about 1 nm.

A free magnetic layer 308 is disposed on layer 306. The free magnetic layer 308 may comprise Co, Fe, B, or combinations thereof such as CoFe, CoFeB or CoFeNiB. The free magnetic layer 308 has a thickness of between about 15 Angstroms to about 75 Angstroms. In one embodiment, the thickness is about 6 nm. A capping layer 310 is disposed on the free magnetic layer 308 and below the second shield S2. The capping layer 310 comprises hafnium, ruthenium, tantalum or combinations thereof. The capping layer 310 has a thickness of between about 15 Angstroms and about 75 Angstroms. In one embodiment, the thickness is about 4 nm. In some embodiments, the capping layer 310 may comprise multiple layers.

The upper shield S2 may comprise multiple layers. The upper shield S2 may comprise a bottom magnetic layer 312 and a top magnetic layer 314 separated by a nonmagnetic spacer layer 316. A second antiferromagnetic layer 318 is disposed on the top magnetic layer 314. The second antiferromagnetic layer 318 comprises PtMn, IrMn, PtPdMn, NiMn or combinations thereof and has a thickness of about 60 angstroms. The nonmagnetic spacer layer 316 may comprise Ta, TaO, Ru, Rh, NiCr, SiC or $Al_2O_3$. The bottom magnetic layer 312 and top magnetic layer 314 may each comprise a ferromagnetic material. Suitable ferromagnetic materials that may be utilized include Ni, Fe, Co, NiFe, NiFeCo, NiCo, CoFe and combinations thereof. In one embodiment, the upper shield S2 comprises NiFe/Ru/NiFe as a three layer structure.

An insulating layer 320 may be disposed along the sidewalls of the sensor and on the bottom shield S1. The insulating layer 320 may comprise an insulating material such as aluminum oxide or silicon nitride. The insulating layer 320 may be deposited by well known deposition methods such as atomic layer deposition (ALD), chemical vapor deposition (CVD), and ion beam sputtering (IBD).

A side shield 322 is disposed on the insulating layer 320. The side shield 322 may comprise a ferromagnetic material. Suitable ferromagnetic materials that may be utilized include Ni, Fe, Co, NiFe, NiFeCo, NiCo, CoFe and combinations thereof. The bottom magnetic layer 312 of the upper shield S2 and side shield 322 are ferromagnetically coupled. The reason for adopting such a construction is to achieve sufficient domain stability of a free magnetic layer 308 in the spin valve element. The upper shield S2 is magnetically stable due to the antiferromagnetically coupling structure. The side shield 322 is also stable because it is coupled ferromagnetically to the stable upper shield S2. In this situation, the bias field from side shield 322 to the free magnetic layer 308 becomes stable and has enough domain stability of a free layer.

However with such a construction, the read resolution in the down track direction becomes worse because magnetic permeability of the upper shield S2 becomes smaller than a conventional reader. The reason the permeability of the upper shield S2 of a side shield reader reduces is that the upper shield S2 becomes magnetically-stable state due to the antiferromagnetically coupling structure. Contrariwise, typically in the case of the upper shield of a conventional reader, a single-layer construction is adopted and the permeability is comparatively large. If the magnetic permeability is small, the shield effect becomes small, so the read resolution becomes poor. When reading recorded signals, if read resolution is worse, the signal to noise ratio (SNR) is lowered, due to increased magnetic transition noise, causing the error rate to become large.

Figure 4:
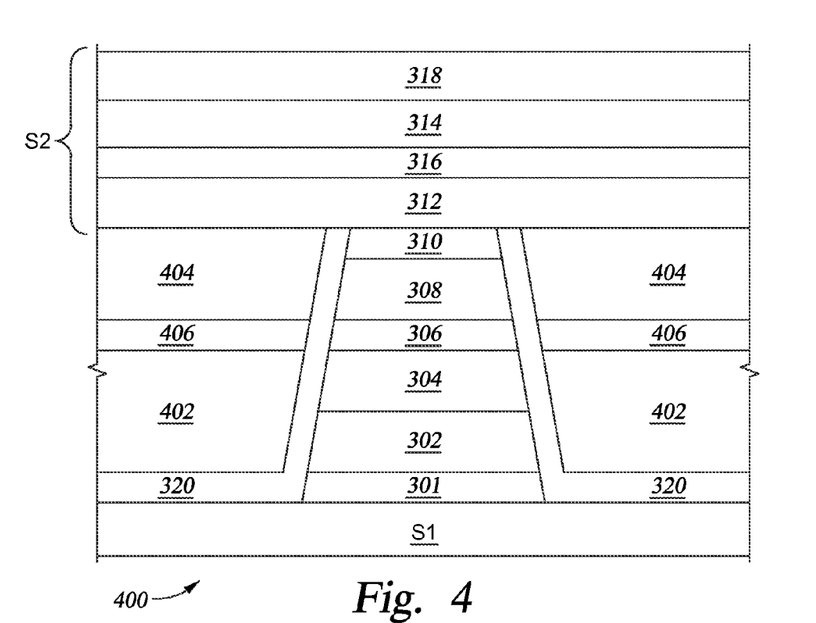
FIG. 4 is a schematic illustration of a read head according to another embodiment.

In order to achieve a large skirt reduction effect and high read resolution, while providing sufficient domain stability, the side shield is formed of multiple layers. In one embodiment, both the upper shield S2 and side shield 322 respectively consists of antiferromagnetically coupled two layers of soft magnetic material as shown in FIG. 4. In FIG. 4, the read head sensor 400 comprises a side shield having a bottom side shield layer 402 and a top side shield layer 404 with a nonmagnetic layer 406 therebetween. The bottom magnetic layer 312 and the top side shield layer 404 are ferromagnetically coupled. In one embodiment, the top side shield layer 404 and bottom side shield layer 402 comprise NiFe while the nonmagnetic layer 406 comprises ruthenium. In another embodiment, the top and bottom side shield layers 402, 404 may comprise CoFe or NiCoFe. In one embodiment, the upper side shield layer 404 and lower side shield layer 402 comprise the same magnetic material, and the thickness of the lower side shield layer 402 is larger than the thickness of the upper side shield layer 404.

The bias direction of the free magnetic layer 308 is opposite to the magnetization direction of bottom magnetic layer 312 in the upper shield S2. If the volume of the lower side shield layer 402 is equivalent to the volume of the upper side shield layer 404, the amount of saturation magnetic flux density (Ms) of the lower side shield layer 402 is larger than the Ms of the upper side shield layer 404. If the Ms of the lower side shield layer 402 is equivalent to Ms of the upper side shield layer 404, the volume of the lower side shield layer 402 is larger than the volume of the upper side shield layer 404. Taken together, the inequality of 3<MsV ratio<7 is satisfied, where MsV is the product of the Ms and V, where Ms is the saturation magnetization quantity and V is volume of the magnetic material. The MsV ratio is defined as the MsV of the bottom side shield layer 402 divided by the MsV of the upper side shield layer 404.

In FIG. 4, the direction of bias magnetic field in the free magnetic layer 308 is anti-parallel to magnetization direction of lower magnetic layer 312 of the upper shield S2. The magnetic anisotropy of lower magnetic layer 312 of the upper shield S2 is weakened effectually by the negative-directed bias field. Therefore, magnetic permeability of the upper shield S2 increases, and as a result, resolution is improved.

Figure 5:
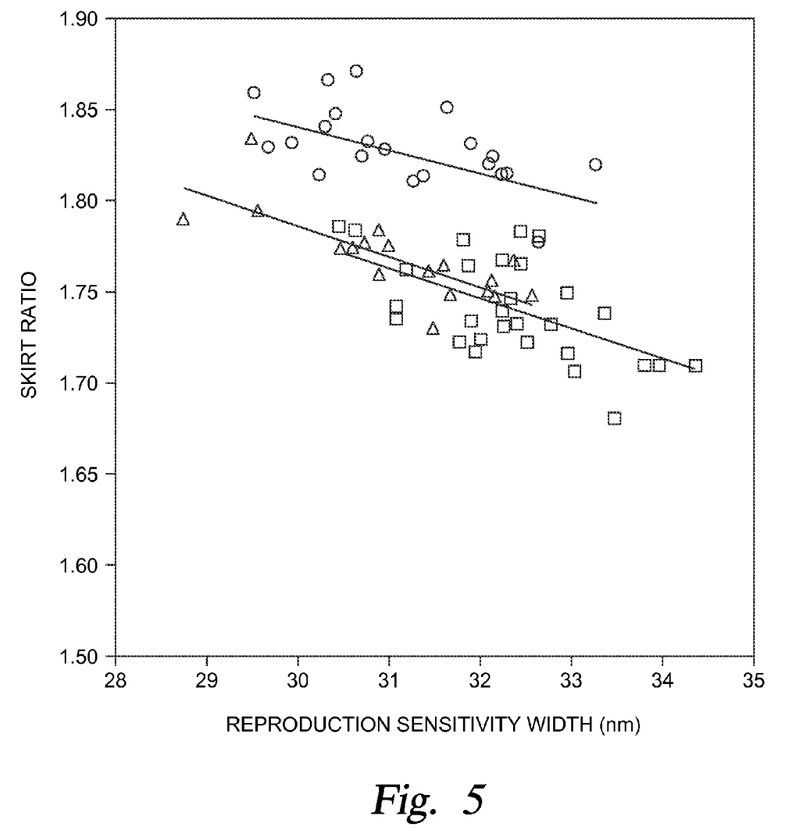
FIG. 5 is a graph illustrating the effect of a side shield on skirt ratio.

The read head sensor 400 has an equivalent skirt ratio compared with that of a side shield read head 300, but has a higher read resolution. The skirt ratio is an index showing the spread of the sensitivity of the skirt. As shown in FIG. 5, the skirt ratio is defined as the sensitivity width in the off track direction when the read sensitivity becomes 10% of the maximum value divided by the sensitivity width when the read sensitivity becomes 50% of the maximum value. Consequently, by reducing the skirt, the skirt ratio becomes smaller. FIG. 5 shows respective test values obtained using a hard bias reader in which a hard magnetic material is arranged on both sides of the spin valve element (circles), a side shield reader of the single-layer shield type of conventional construction (triangles), and a side shield reader with multiple layers (squares). In each case, the geometrical width of the spin valve element was 28 nm, and the element height was 45 nm. The side shield layer of the multiple layer side shield employed a 3-layer structure of NiFe(5 nm)/Ru(1 nm)/NiFe (15 nm). It is found that the skirt ratio of the multilayer side shield structure is obviously smaller than that of the hard bias reader and almost same as that of the conventional side shield reader whose side shield is a single side shield layer.

Figure 6:
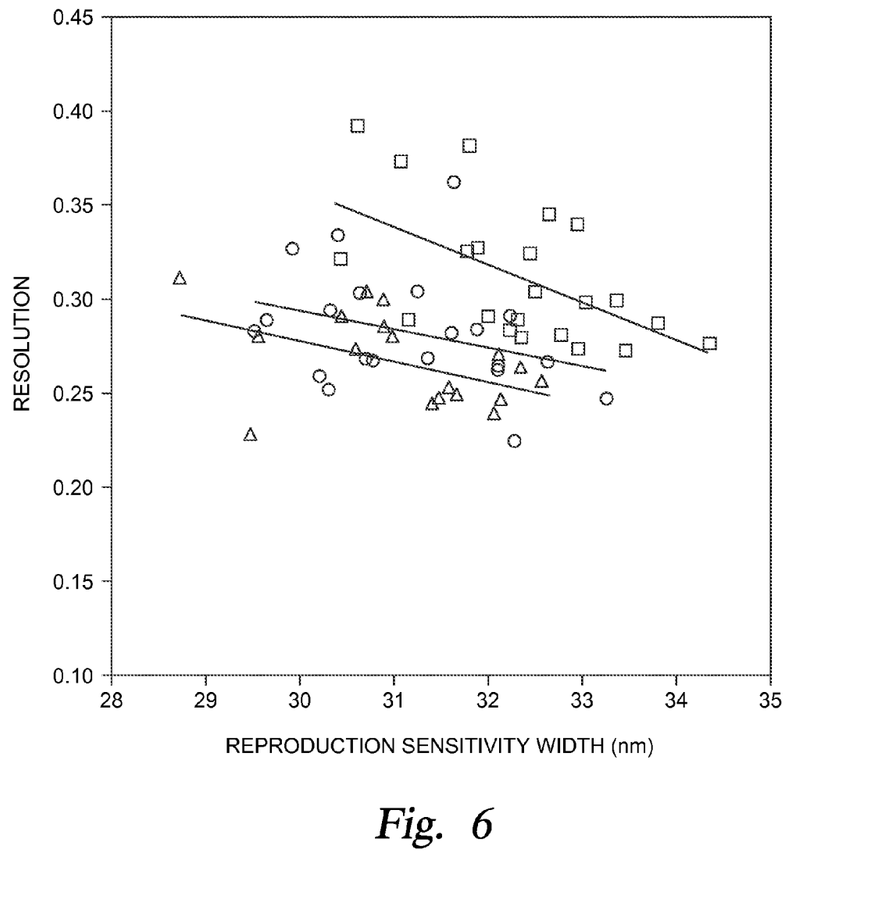
FIGS. 6 and 7 are graphs illustrating the resolution of a multilayer side shield sensor.
Figure 7:
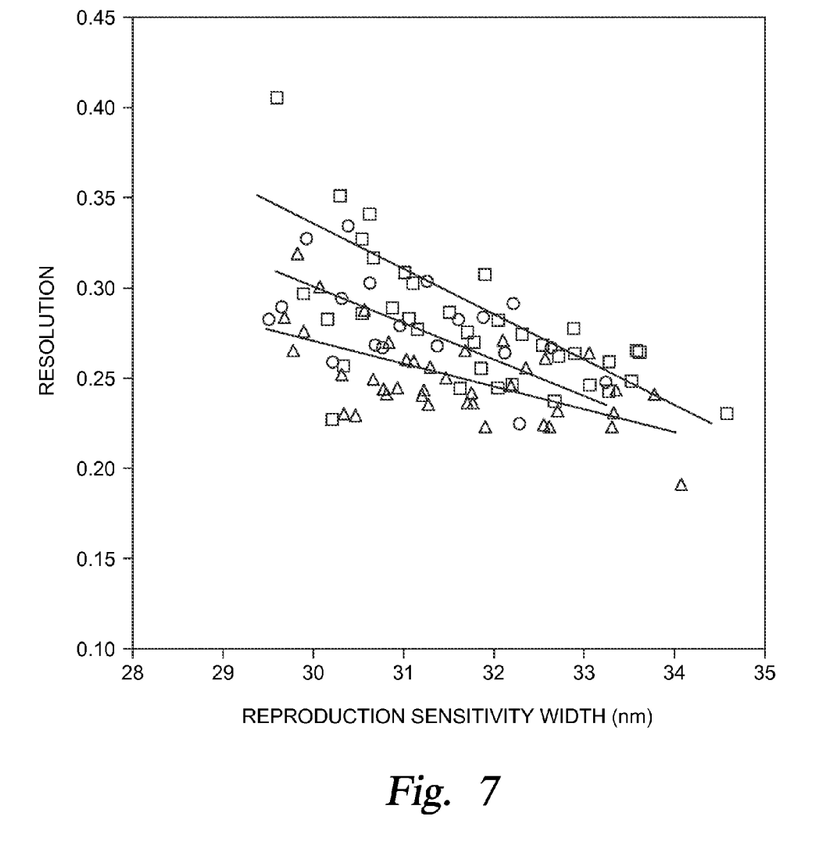

FIGS. 6 and 7 show the relationship of the magnetic read width and the read resolution in the down track direction. Read resolution is defined as the signal amplitude of 200 kBPI pattern divided by the signal amplitude of 1000 kBPI pattern. FIG. 6 shows respective test values of read head using hard bias material (circles), a side shield reader of the single-layer shield type (triangles), and a side shield read head using multiple layers (squares). It can be seen that the read resolution of the read head of the multilayer side shield is improved compared with that of a single layer side shield read head. The reason why the read resolution is improved is that the magnetic permeability of the bottom magnetic layer 312 of the upper shield S2 is increased.

As shown in FIG. 7, resolution improves when the direction of bias magnetic field becomes anti-parallel to the magnetization direction of the upper shield S2 bottom magnetic layer 312. In the multilayer side shield read head sensor, the bias field direction points in the opposite direction (i.e., anti-parallel) to the magnetization direction in the bottom magnetic layer 312 of the upper shield S2. In this case, magnetic anisotropy of the bottom magnetic layer 312 of the upper shield S2 is effectively weakened, and as a result, magnetic permeability of the upper shield S2 becomes larger. It can make magnetic shield effect larger and make read resolution higher.

By utilizing multiple layers for the side shied in a side shield read head sensor, both smaller skirt ratio and higher resolution are achieved at the same time. Additionally, such a read head sensor has reader utilization controllability. By adjusting the balance of magnetization amounts of side shield layers, the bias field strength can be controlled. The multilayer side shield read head sensor has a higher TPI and higher BPI recording. Therefore, next generation products can adopt the structure for ultrahigh-density recordings.

While the foregoing is directed to exemplified embodiments, other and further embodiments of the invention may be devised without departing from the basic scope thereof, and the scope thereof is determined by the claims that follow.

What is claimed is:

1. A read head sensor, comprising:
    a bottom shield;
    a top shield disposed over the bottom shield, wherein the top shield includes:
        a bottom magnetic layer;
        a first nonmagnetic layer disposed on the bottom magnetic layer;
        a top magnetic layer disposed on the first nonmagnetic layer; and
        an antiferromagnetic layer disposed on the top magnetic layer;
    a sensor element disposed between the bottom shield and the top shield; and
    a side shield disposed adjacent the sensor element, over the bottom shield and below the top shield, wherein the side shield includes:
        a bottom side shield layer disposed over the bottom shield;
        a second nonmagnetic layer disposed on the bottom side shield layer; and
        a top side shield layer disposed on the second nonmagnetic layer, where the inequality of 3<MsV ratio<7 is satisfied, where MsV ratio is MsV of the bottom side shield layer divided by MsV of the top side shield layer, where MsV is the product of Ms and V, where Ms is a saturation magnetization quantity and V is volume of a magnetic material.

2. The read head sensor of claim 1, wherein the bottom side shield layer and the top side shield layer comprise the same material.

3. The read head sensor of claim 2, wherein the bottom side shield layer and the top side shield layer comprise NiFe, CoFe or NiCoFe.

4. The read head sensor of claim 3, wherein the second nonmagnetic layer comprises ruthenium.

5. The read head sensor of claim 1, wherein the bottom side shield layer is thicker than the top side shield layer.

6. The read head sensor of claim 1, wherein the sensor element includes a free magnetic layer that is biased antiparallel to the bottom magnetic layer.

7. A read head sensor, comprising:
    a bottom shield;
    a top shield disposed over the bottom shield, wherein the top shield includes:
        a bottom magnetic layer;
        a first nonmagnetic layer disposed on the bottom magnetic layer;
        a top magnetic layer disposed on the first nonmagnetic layer; and
        an antiferromagnetic layer disposed on the top magnetic layer;
    a sensor element disposed between the bottom shield and the top shield; and
    a side shield disposed adjacent the sensor element, over the bottom shield and below the top shield, wherein the side shield includes multiple magnetic layers, where the inequality of 3<MsV ratio<7 is satisfied, where MsV ratio is MsV of a bottom magnetic layer of the multiple magnetic layers divided by MsV of a top magnetic layer of the multiple magnetic layers, where MsV is the product of Ms and V, where Ms is a saturation magnetization quantity and V is volume of a magnetic material.

8. The read head sensor of claim 7, wherein the multiple magnetic layers comprise the same material.

9. The read head sensor of claim 8, wherein the multiple magnetic layers comprise NiFe, CoFe or NiCoFe.

10. The read head sensor of claim 7, wherein the multiple magnetic layers have different thicknesses.

11. The read head sensor of claim 7, wherein the sensor element is a TMR sensor.

12. The read head sensor of claim 11, wherein the multiple magnetic layers comprise NiFe, CoFe or NiCoFe.

13. The read head sensor of claim 7, wherein the sensor element comprises a free magnetic layer that is biased antiparallel to the bottom magnetic layer.

14. A storage device, comprising:
    one or more magnetic disks;
    a spindle motor coupled to the one or more magnetic disks, wherein the spindle motor is coupled to a chassis;
    an actuator coupled to the chassis;
    one or more actuator arms coupled to the actuator and movable from a first position to a second position, wherein the second position is closer to the one or more magnetic disks than the first position; and
    a read head sensor coupled to each actuator arm, wherein at least one read head sensor comprises:
        a bottom shield;
        a top shield disposed over the bottom shield, wherein the top shield includes:
            a bottom magnetic layer;

a first nonmagnetic layer disposed on the bottom magnetic layer;
a top magnetic layer disposed on the first nonmagnetic layer; and
an antiferromagnetic layer disposed on the top magnetic layer;
a sensor element disposed between the bottom shield and the top shield; and
a side shield disposed adjacent the sensor element, wherein the side shield is disposed over the bottom shield and below the top shield, wherein the side shield includes multiple magnetic layers, where the inequality of 3<MsV ratio<7 is satisfied, where MsV ratio is MsV of a bottom side shield layer of the multiple magnetic layers divided by MsV of a top side shield layer of the multiple magnetic layers, where MsV is the product of Ms and V, where Ms is a saturation magnetization quantity and V is volume of a magnetic material.

15. The storage device of claim 14, wherein the side shield includes:
the bottom side shield layer disposed over the bottom shield;
a second nonmagnetic layer disposed on the bottom side shield layer; and
the top side shield layer disposed on the second nonmagnetic layer.

16. The storage device of claim 15, wherein the bottom side shield layer and the top side shield layer comprise the same material.

17. The storage device of claim 16, wherein the bottom side shield layer and the top side shield layer comprise NiFe, CoFe or NiCoFe.

18. The storage device of claim 15, wherein the sensor element comprises a free magnetic layer that is biased anti-parallel to the bottom magnetic layer.

19. The storage device of claim 14, wherein the multiple magnetic layers comprise the same material.

20. The storage device of claim 19, wherein the multiple magnetic layers comprise NiFe, CoFe or NiCoFe.

21. The storage device of claim 14, wherein the multiple magnetic layers have different thicknesses.

22. The storage device of claim 14, wherein the sensor is a TMR sensor.

* * * * *